United States Patent [19]
Benda et al.

[11] Patent Number: 5,185,753
[45] Date of Patent: Feb. 9, 1993

[54] CIRCULAR AND ELLIPTICAL POLARIZATION OF A HIGH POWER LASER BY ADJOINT FEEDBACK

[75] Inventors: John A. Benda, Amston; Paul R. Blaszuk, Lebanon, both of Conn.

[73] Assignee: United Technologies Corporation, Hartford, Conn.

[21] Appl. No.: 781,428

[22] Filed: Oct. 23, 1991

[51] Int. Cl.$^5$ .................................... H01S 3/10
[52] U.S. Cl. ............................. 372/27; 372/95; 372/94
[58] Field of Search .................... 372/95, 94, 27

[56] References Cited

U.S. PATENT DOCUMENTS

| | | | |
|---|---|---|---|
| 4,669,088 | 5/1987 | Waite et al. | 372/95 |
| 4,682,339 | 7/1987 | Sziklas et al. | 372/94 |
| 4,792,765 | 12/1988 | Smith et al. | 372/95 |
| 4,841,541 | 6/1989 | Sziklas et al. | 372/94 |

Primary Examiner—Georgia Y. Epps

[57] ABSTRACT

An unstable resonator system is controlled in polarization by the use of a compound resonator in which the parent resonator is coupled to a polarization control leg by an aperture that passes a small portion of the output beam into a polarization control element and returns a polarized feedback beam mode-matched to the adjoint mode of the parent resonator.

17 Claims, 2 Drawing Sheets

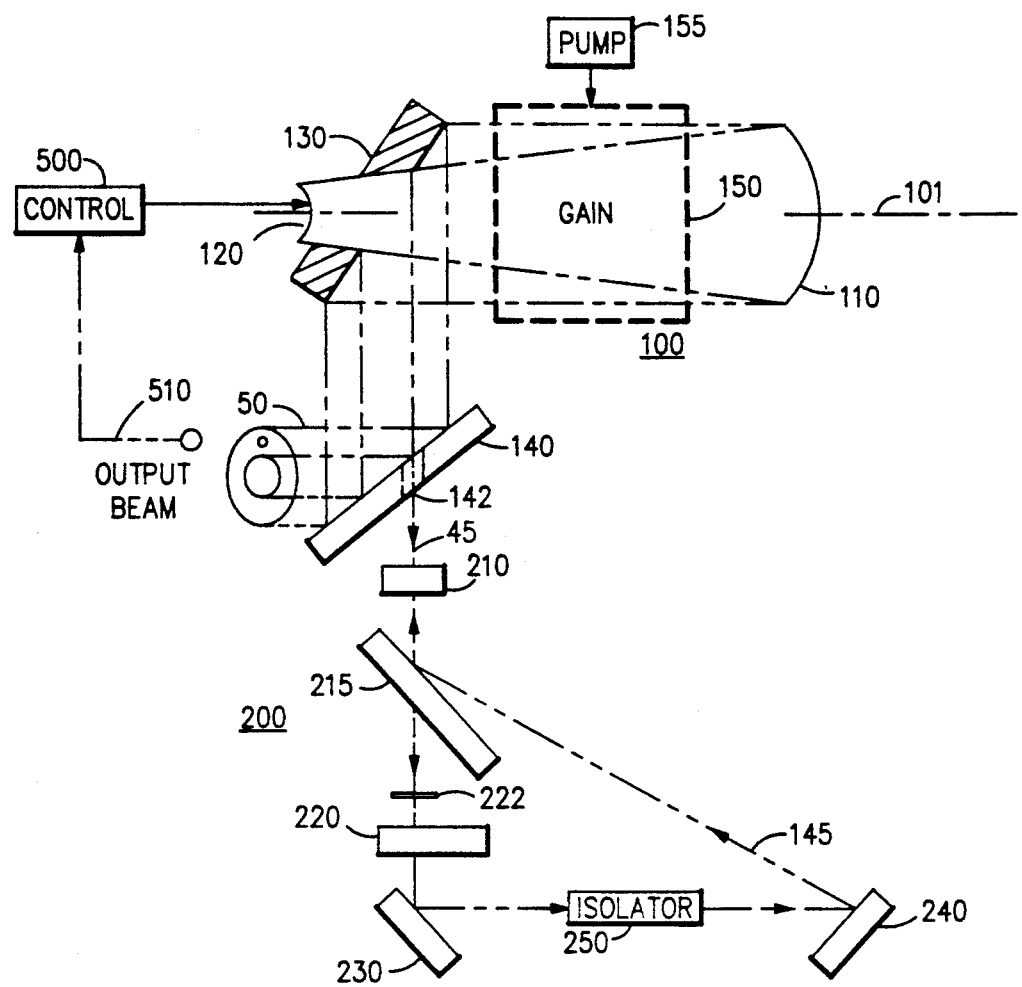
FIG.1
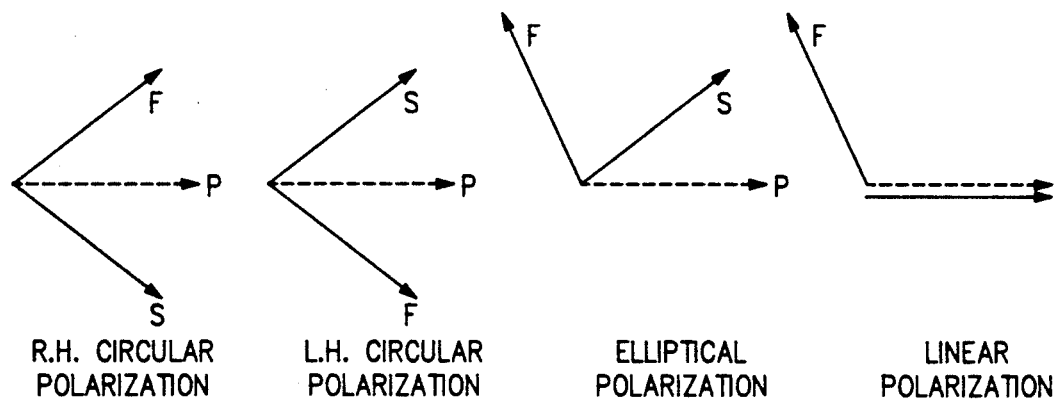
R.H. CIRCULAR POLARIZATION
FIG.3A
L.H. CIRCULAR POLARIZATION
FIG.3B
ELLIPTICAL POLARIZATION
FIG.3C
LINEAR POLARIZATION
FIG.3D

CIRCULAR AND ELLIPTICAL POLARIZATION OF A HIGH POWER LASER BY ADJOINT FEEDBACK

CROSS REFERENCE TO RELATED APPLICATIONS

This application is related to the subject matter disclosed and claimed in copending
U.S. Ser. No. 07/781,771 entitled A HIGH POWERED LASER WITH REDUCED OPTICAL ABERRATION by P. R. Blaszuk;
U.S. Serial No. 02/780,897 entitled A HIGH POWER LASER HAVING STAGED LASER ADJOINT PULSED FEEDBACK by S. S. Townsend, P. R. Cunningham and J. S. Foley;
U.S. Ser. No. 07/780,637 entitled OPTICALLY PULSED LASER HAVING COUPLED ADJOINT BEAMS by J. A. Benda;
U.S. Ser. No. 07/780,989 entitled A MODE-LOCKED HIGH POWER LASER HAVING AN ADJOINT FEEDBACK BEAM by J. A. Benda, P. R. Blaszuk and G. E. Palma;
U S. Ser. No. 07/781,431 entitled PULSED RING LASERS USING ADJOINT COUPLING CONTROL by G. E. Palma and J. A. Benda;
U.S. Ser. No. 07/781,430 entitled OPTICALLY PULSED LASER by J. A. Benda, P. R. Blaszuk, G. E. Palma and D. C. Smith;
U.S. Ser. No. 07/781,426 entitled LINEAR POLARIZATION CONTROL OF HIGH POWER LASERS by J. A. Benda, P. R. Blaszuk, J. Forgham and H. L. Cohen;
U.S. Ser. No. 07/781,427 entitled IMPROVED LINEAR POLARIZATION CONTROL OF HIGH POWER LASERS by G. E. Palma, S. S. Townsend, A. Parasco and J. A. Benda; filed on even date herewith and assigned to the same assignee herein incorporated by reference.

TECHNICAL FIELD

The field of the invention is that of high power lasers having an output mode that is magnifying and an adjoint mode that is demagnifying.

BACKGROUND ART

U.S. Pat. No. 4,682,339, assigned to the assignee hereof, illustrates a method of coupling standing wave lasers in which two modes exist in the resonator, one magnifying as it circulates in the resonator and the other demagnifying. A portion of the output beam is sampled and injected back into the resonator mode-matched to the demagnifying mode. U.S. Pat. No. 4,841,541, illustrates the use of adjoint coupling with unstable ring resonators. These disclosures relate to unpolarized lasers.

DISCLOSURE OF INVENTION

The invention relates to a method of controlling the polarization of a high power laser resonator to produce elliptically or circularly polarized output beams. A polarization discriminating element within a low power feedback beam is used to control polarization rather than control by use of a polarization discriminating element within the parent resonator.

A portion of the laser output beam is passed into a polarizing element that converts unpolarized radiation to radiation of the desired polarization state and reflects preferentially the desired polarization state back into the adjoint mode of the resonator such that it is mode-matched to the adjoint mode.

Other features and advantages will be apparent from the specification and claims and from the accompanying drawings which illustrate an embodiment of the invention.

BRIEF DESCRIPTION OF DRAWINGS

FIG. 1 illustrates an embodiment of the invention adapted to produce circular polarization from a standing wave unstable resonator.

FIG. 3 illustrates the operation of a quarter wave plate.

BEST MODE FOR CARRYING OUT THE INVENTION

Figure 2:
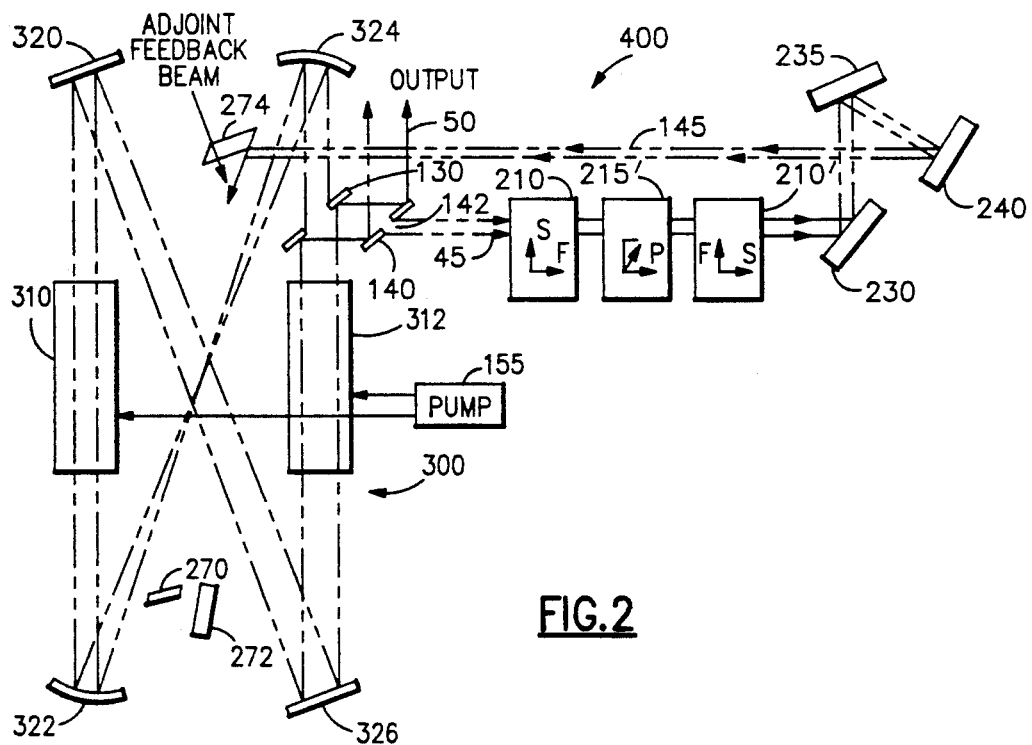
FIG. 2 illustrates an embodiment of the invention adapted to produce circular polarization from a ring resonator.

It has been shown by many investigators that control of the polarization of a high power laser beam can have profound influence on the welding and cutting performance. Circular polarization has been shown to produce very uniform cutting in two dimensional cutting. Linear polarization can enhance the coupling for deep penetration welding if the polarization vector is aligned to maximize the absorption in the key hole.

A difficulty that has interfered with progress in the art is that it has been difficult to achieve satisfactory control of the polarization of high power lasers. The usual methods employed with low power lasers are not feasible with high power and workers in the art have had to make do with unsatisfactory substitutes that will only generate linear polarization such as a pair of orthogonal mirrors located in the cavity. Being in the cavity, they are very sensitive to alignment errors and difficult or impossible to adjust without dismantling the laser.

As is explained in copending patent application Ser. No. 781,430, the use of adjoint feedback has been found to be a way of controlling the pulsed operation of a high power laser. It has been used successfully to pulse a high power laser and to phase lock lasers. Adjoint feedback consists of taking a portion of the output of a laser and retroreflecting it back into the resonator so that it is mode-matched to the adjoint mode (the demagnifying wave) of the resonator or, in the case of coupling, injecting it into the adjoint mode of another laser. An advantage of using an adjoint feedback beam is that the "leverage" it provides in resonator control permits the use of a small low power beam which is not part of the main resonator. Optics in the adjoint feedback beam can be readily changed or rotated.

This invention teaches a technique where adjoint feedback can be used to create any desired circular or elliptical polarization of a high power laser. For purposes of the claims, "elliptical" will be taken to include "circular", since a circle is a special case of an ellipse and since the circularity will never be perfect. FIG. 1 shows a positive branch unstable resonator 100 with adjoint feedback used to provide circular polarization of output beam 50. Radiation resonates between mirrors 110 and 120 in a conventional manner and is extracted by scraper mirror 130 as output beam 50. The apparatus in the bottom portion of the Figure, referred to generally by the numeral 200 that is one embodiment of an adjoint feedback means that converts a small extracted feedback beam to circular polarization and uses it to control the polarization state of beam 50. In the low power adjoint beam path we place a quarter wave phase retarder 210. This device can be either reflective with phase retarding coatings or refractive. Both are commercially available. These devices have a "fast" and "slow" axis. If two linearly polarized beams travel through the retarder, one on the fast axis and one on the slow, they will experience a relative phase shift of 90° in traveling through the retarder. The four views in FIG. 3 are all shown with the propagation vector coming out of the plane of the paper toward the viewer and indicate the relative orientations of the fast axis F, the slow axis S and the beam polarization vector P.

If we wish the laser to run with left circular polarized output, we arrange the quarter wave plate fast and slow axes to produce a horizontal linear polarized beam by aligning the fast axis 45° clockwise from horizontal when viewed counter to the propagation of the beam. This polarization passes right through the thin film plate polarizer 215, which is oriented so that horizontally polarized radiation is completely transmitted. Half wave plate 220 rotates the plane of polarization to the vertical; i. e., perpendicular to the plane of the paper. Polarization beamsplitter 222 is not used in this embodiment. This beam reflects off mirror 230, passes through isolator 250 and is directed by mirror 240 back onto thin film 215 at the angle designed to reflect back up the adjoint path of beam 45. Since the return beam from mirror 240 is vertically polarized, it reflects from the film polarizer 215 rather than passing through it. The quarter wave plate 210 then converts the beam to a right circular polarization propagating back into the laser on the adjoint path. Two feedback apertures could be used, with mirror 240 directing the return beam back toward the aperture (through plate 210 or another plate) without the reflection off plate 215. A drawback of such an arrangement is that only the power from one aperture is used, but isolator 250 receives the full power from the other aperture. In the embodiment illustrated, the rear end of the isolator sees very little power if the polarization control is successful. A two-aperture embodiment is, however, a convenient way to get elliptical polarization because there would be no constraint on the polarization before and after the isolator because of the presence of one polarization beamsplitter. This benefit may be worth the increased power on the isolator in a particular example.

Upon retroreflection in the resonator off mirror 130, this return beam 45 converts to left circular polarization. In general, the adjoint feedback means 200 receives a circular (elliptical) polarized output sample beam and returns a mode-matched beam of opposite helicity for a self-consistent set of polarizations for the feedback and circulating beams. Note that without isolator 250 the system is degenerate. If a right circular polarized beam left the laser on the adjoint path the quarter wave plate would convert it to a vertically polarized beam which would reflect from the thin film polarizer, travel to the mirror in the lower right reflect back through the half wave plate becoming horizontally polarized which would pass through the thin film polarizer and the quarter wave plate would turn it into a left circular polarization. The isolator is needed to remove this degeneracy. For $CO_2$ lasers, a suitable isolator is a commercially available unit available from Optics For Research of Caldwell, N.J. 07006. The mechanism of the invention is that the adjoint feedback beam decreases the cavity loss for one handedness of circular polarization but not the other; i.e. the composite resonator formed by parent resonator 100 and control leg 200 has a lower loss for radiation that output as left circularly polarized.

Note also that the half wave plate in FIG. 1 could be replaced by two roof mirrors which, at suitable orientation (45° to the horizontal), would rotate the beam and the polarization by 90°. Also, some isolators rotate the polarization 45° in which case only an additional 45° of rotation is needed. Those skilled in the art may readily devise other means to return an adjoint feedback beam of opposite helicity. Because the polarization beamsplitter requires orthogonal linear polarizations, this embodiment will generate circular beams, not a beam with a substantial ellipticity.

A conventional photodetector 510 samples output beam 50 and transmits a signal to controller 500. Controller 500, which may be a programmed general purpose computer, may control the cavity length of resonator 100 and/or the cavity length of contact leg 200 or the orientation of any of the polarizing elements by conventional positioning means that are understood to be represented by the schematic symbols representing mirrors and polarizers. It is an advantageous feature of the invention that active length control is not required for a resonator 100 that is not frequency-selective.

The invention can be applied to a ring resonator to generate a circular polarized output in a simpler fashion without an isolator. FIG. 2 shows a typical ring resonator that has been configured to polarize the output of the ring by controlling the polarization in the adjoint feedback beam. Resonator 300 operates in conventional fashion. It has two gain cells 310 and 312 connected by two flat mirrors 320 and 326 and two curved mirrors 322 and 324 which form a confocal magnification leg. Mirror 270 deflects the reverse wave toward mirror 272, which couples it into the forward wave. Radiation is deflected out of the resonator by scraper mirror 130 and turning mirror 140. Aperture 142 in mirror 140 couples a small beam 45 into control leg 400.

To understand the operation of leg 400, consider a left circular wave traveling in the adjoint feedback path 45 from the output mirror 130 to the first quarter wave plate 210. Plate 210, oriented as shown, will convert the beam to linear polarization. Those skilled in the art will appreciate that in this and other embodiments of the invention, quarter wave plates could be replaced with reflective phase retarders with appropriate conversions to a reflective geometry. Linear polarizer 215' oriented with its polarization vector at 45°, passes the beam with no attenuation and the second quarter wave plate 210' converts the beam back to left circular polarization. Plates 210, 215' and 210' can be rigidly bonded together for easier alignment. The three mirrors 230, 235 and 240 (or any odd number) are required to put the correct polarization back into the adjoint mode in the ring 300. This is a result of the fact that a circular polarized beam reverses its helicity on every reflection, so that the radiation leaving mirror 230 is right polarized, then left, then right again to re-enter resonator 300 as left circularly polarized radiation, the same as that reflected from mirror 324. When this radiation is coupled into the ring by mirror 274, it is finally converted into the left circular polarization that is required to mode match to the adjoint beam. This system is not degenerate. If you try to propagate a right circular polarized beam through the adjoint beam path, the linear polarizer 215' will cut off the beam. A reverse wave suppressor mirror 270-272 may be needed. See, for example, H. Mirels, et al, "Reverse Wave Suppression in Unstable Ring Resonator", Appl. Opt. 23, 4509, 1984) to prevent the laser from running in the reverse direction, but it must be positioned so that it does not interfere with the propagation of the adjoint feedback beam, as is shown in the Figure. The invention works best when the parent ring resonator has no polarization discrimination built into it, such as planar a ring with an even number of mirrors.

Elliptical polarization is easier to achieve with the ring resonator embodiment. If the angle between the axis of polarizer 215' and the fast axis of the first retarder 210, $\theta$, is less than 45°, the major axis of the ellipse lies along the retarder's fast axis and the ellipticity is given by, $$\frac{b}{c} = \frac{1 - \cos 2\theta}{\sin 2\theta} \quad (1)$$

If $\theta$ is between 45° and 90°, the major axis lies along the retarder's slow axis, and the ellipticity is given by the inverse of equation (1). In both cases, the ellipse's major axis can be changed by rotating polarizer 215' and retarders 210 and 210' in unison. Elliptical polarization can be used to correct for the linear polarization discrimination of turning flats in the external beam path, giving a net output of circular polarization at the work piece.

Elliptical polarization is possible with the standing wave embodiment, but is much more difficult to achieve. The problem arises because one wants to rotate the linear polarization by $2\theta$, not 90°, to achieve the proper elliptical polarization for the feedback beam returning to the parent resonator. Unfortunately, the polarization beamsplitter 215 will reflect only the orthogonal linear polarization coming from mirror 240. One can circumvent this by using a new beamsplitter 222 after the polarizer 215 to retroreflect a portion of the unrotated linear polarization back through the polarizer 215 and pass the remainder through to half wave plate 220, isolator 250 and to mirrors 230 and 240 as before to combine with the returning radiation from splitter 222. With the proper position and reflectivity of polarizer 222, the retroreflected beam combines with the orthogonal polarization from mirror 240 to produce the proper orientation of linear polarization incident on the quarter wave plate. The optical path of the control leg must be maintained, either by alignment of a rugged mounting system or by a conventional active length control system.

Figure 4:
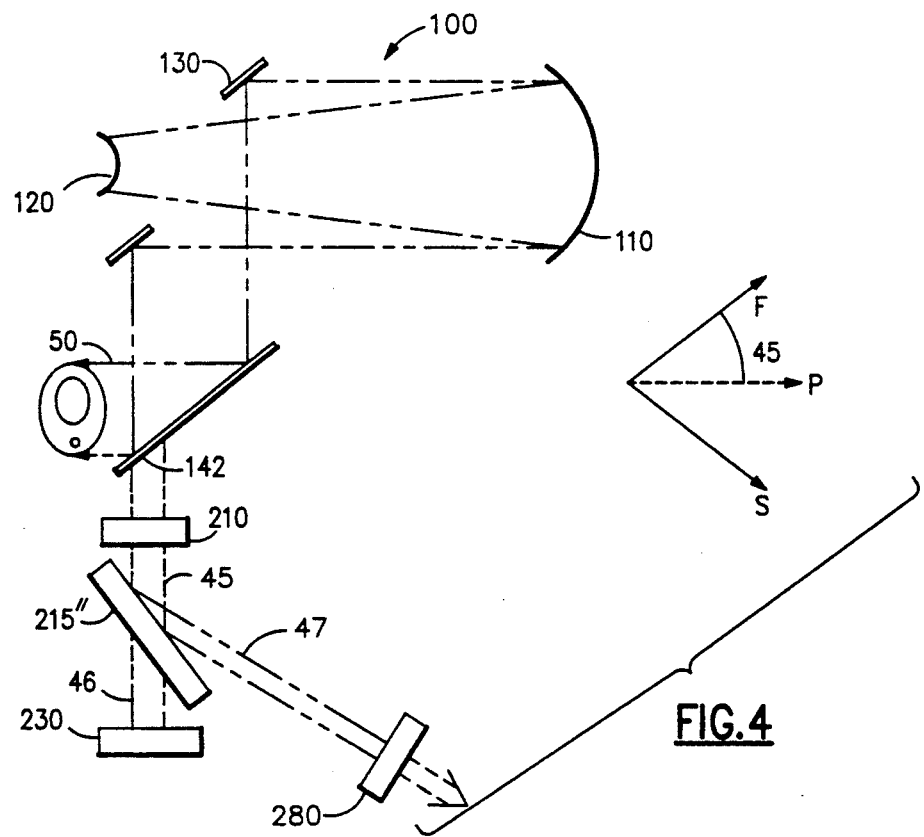
FIG. 4 illustrates an embodiment of the invention adapted to produce elliptical polarization from a standing wave unstable resonator.

Finally an approximate version of the standing wave embodiment has been found, as shown in FIG. 4. It consists of a quarter wave plate 210 followed by a plate polarizer 215'', whose axis is at 45° to the axis of the retarder 210, and a retromirror 230. Beam 46 retroreflected from retromirror 230 will be injected into resonator 100 with the wrong circularity. However, with addition of a small amount of backscatter of beam 47 reflected from the polarization beamsplitter 280, either accidental or intentionally introduced, analysis shows that two polarization modes (in resonator 100) are possible with a small amount of mode discrimination between them. Both are nearly circular and of the opposite handedness to beam 46. Assuming that only one mode runs, the output will be nearly circular. In an experiment with the resonator of FIG. 4, elliptical output was obtained with an ellipticity about 1.2.

Polarization control through the use of the adjoint mode has been found to be unexpectedly insensitive to external influence, such as vibration. Successful control of a laser operating at powers in the 1 kilowatt range has been achieved without the use of vibration isolation, using the polarization control apparatus of FIG. 4. One skilled in the art would have expected that active control of the length of control leg 40 (or very stable mounting) would be required in order to feed the adjoint mode power back into parent resonator 100 without disturbing the phase of the circulating power, but this was not the case. It was found that the parent resonator always runs on a transition for which the adjoint feedback beam reduced cavity losses to a minimum. $CO_2$ lasers are very well adapted to this, but any gain medium with a broad gain profile will have a correspondingly reduced sensitivity to a length change. The invention has been tested with $CO_2$ lasers, but is not restricted to any gain medium or frequency range. Operation with YAG lasers or in the visible is also suitable. For the case of a gain medium with a narrow gain width, active length control of the feedback means may be required.

It has been found that adjoint mode polarization control requires a threshold amount of feedback power that, for a given feedback aperture position, is a function of the diameter of the feedback aperture. There is thus a feedback threshold amount of return power and a corresponding threshold feedback diameter. The output beam quality, conventionally measured as the deviation of the focal spot size of the actual focused beam spot from diffraction limited, is degraded as the feedback aperture diameter increases. For a given parent resonator, there is thus an upper diameter limit set by the application requirement for beam quality. It is an advantage of the present invention that polarization control can be achieved with smaller feedback power and thus improved beam quality. Polarization control by feeding power in a nonadjoint mode would take on the order of 1% of the circulating power. With the present invention, control is achieved with feedback power on the order of 0.1% of the circulating power.

It should be understood that the invention is not limited to the particular embodiments shown and described herein, but that various changes and modifications may be made without departing from the spirit and scope of this novel concept as defined by the following claims.

We claim:

1. A laser system for producing a circularly polarized output beam comprising an unstable parent laser resonator having a gain medium, pump means for producing a population inversion in said gain medium, mirror means disposed along an axis for directing optical radiation through said gain medium in a magnifying output mode and a demagnifying adjoint mode, and output means for directing an output beam out of said unstable resonator, comprising;

adjoint feedback means having at least one feedback aperture disposed to intercept radiation in said magnifying output mode, whereby a portion of said radiation in said magnifying output mode passes through said at least one feedback aperture as an output feedback beam, and for passing through a return feedback aperture of said at least one feedback aperture an adjoint mode feedback beam mode matched to said demagnifying adjoint mode;

said adjoint feedback means including adjoint feedback reflection means for receiving said output feedback beam passed through said feedback aperture and for feeding back through said return feedback aperture said adjoint mode feedback beam having a predetermined amount of feedback power in said demagnifying adjoint mode, whereby radiation in said output mode in said parent resonator is coupled to said adjoint mode in said parent resonator through the passing of said adjoint mode feedback beam through said return feedback aperture, and said laser system comprises a composite resonator including said parent laser resonator and a resonator control leg comprising said adjoint feedback reflection means;

feedback beam polarization means are located intercepting said output feedback beam, for impressing a desired polarization state on said adjoint mode feedback beam, so that said resonator control leg comprises said adjoint feedback reflection means and said feedback beam polarization means and feeds radiation in a desired circular polarization state above a predetermined feedback threshold amount back into said parent laser resonator mode-matched to said adjoint mode so that said resonator control leg controls the polarization of said parent laser resonator.

2. A laser system according to claim 1, in which said parent resonator is a standing wave unstable resonator.

3. A laser system according to claim 1, in which said feedback aperture has a diameter greater than a threshold feedback diameter that passes said predetermined feedback threshold amount of feedback power and less than a predetermined upper diameter limit determined by a desired beam quality.

4. A laser system according to claim 2, in which said beam polarization means comprises a quarter wave plate for receiving a circularly polarized output feedback beam travelling along a feedback beam axis and passing a linearly polarized beam therethrough, having a first linear polarization direction; and polarization rotation means and adjoint feedback reflection means for receiving said linearly polarized beam having said first linear polarization direction and returning a linearly polarized beam having a second polarization direction orthogonal to said first linear polarization direction back to said quarter wave plate, whereby said quarter wave plate returns a circularly polarized adjoint feedback beam having a helicity opposite to that of said output feedback beam.

5. A laser system according to claim 4, in which said polarization rotation means includes a polarization element for passing radiation in said first linear polarization direction, oriented to reflect radiation returning from said adjoint feedback reflection means back into said return feedback aperture;

a polarization rotation element for rotating radiation in said first linear polarization direction by 90°; and said adjoint feedback reflection means transports radiation from said polarization rotation element to said polarization element as return radiation in a second polarization direction orthogonal to said first linear polarization direction and at an angle such that said return radiation is reflected back through a quarter wave plate into said return feedback aperture in a return circular polarization state of opposite helicity to said first circular polarization state.

6. A system according to claim 2, in which said adjoint feedback reflection means comprises a quarter wave plate for receiving a circularly polarized output feedback beam travelling along a feedback beam axis and passing a linearly polarized beam therethrough, having a first linear polarization direction;

polarization rotation means comprising a polarizing plate, disposed at a predetermined return reflection angle with respect to said feedback axis, for passing radiation having said first linear polarization direction;

means for rotating said radiation in said first linear polarization direction to a second polarization direction orthogonal to said first linear polarization direction to form said adjoint mode feedback beam; and beam transport means for passing said adjoint mode feedback beam into said return feedback aperture.

7. A system according to claim 4, in which said beam transport means comprises at least one mirror for transporting radiation emitting from said half wave plate to reflect off an initial surface of said polarizing wave plate along said feedback beam axis into said return feedback aperture.

8. A laser system for producing an elliptically polarized output beam comprising an unstable parent laser resonator having a gain medium, pump means for producing a population inversion in said gain medium, mirror means disposed along an axis for directing optical radiation through said gain medium in a magnifying output mode and a demagnifying adjoint mode, and output means for directing an output beam out of said unstable resonator, comprising;

adjoint feedback means having at least one feedback aperture disposed to intercept radiation in said magnifying output mode, whereby a portion of said radiation in said magnifying output mode passes through said at least one feedback aperture as an output feedback beam, and for passing through a return feedback aperture of said at least one feedback aperture an adjoint mode feedback beam mode matched to said demagnifying adjoint mode;

said adjoint feedback means including adjoint feedback reflection means for receiving said output feedback beam passed through said feedback aperture and for feeding back through said return feedback aperture said adjoint mode feedback beam having a predetermined amount of feedback power in said demagnifying adjoint mode, whereby radiation in said output mode in said parent resonator is coupled to said adjoint mode in said parent resonator through the passing of said adjoint mode feedback beam through said return feedback aperture, and said laser system comprises a composite resonator including said parent laser resonator and a resonator control leg comprising said adjoint feedback reflection means;

feedback beam polarization means are located intercepting said output feedback beam, for impressing a desired polarization state on said adjoint mode feedback beam, so that said resonator control leg comprises said adjoint feedback reflection means and said beam polarization means and feeds radiation in a desired elliptical polarization state above a predetermined feedback threshold amount back into said parent laser resonator mode-matched to said adjoint mode so that said resonator control leg controls the polarization of said parent laser resonator;

polarization reflection means for separating said output feedback beam into a transmitted feedback beam having radiation in first and second orthogonal linear polarization states with a predetermined distribution of power in said first and second orthogonal linear polarization states, for manipulating said transmitted beam, and for directing a return feedback beam having a desired distribution of power in said first and second orthogonal linear polarization states back into said feedback aperture mode matched to said adjoint mode 9. A system according to claim 8, in which said feedback beam polarization means comprises a quarter wave plate for converting elliptically polarized output feedback radiation, having a major axis oriented along a feedback polarization axis and an output feedback helicity, to a transmitted feedback beam having radiation in a first one of two linear polarization states;

a first linear polarizer mounted at a predetermined reflection angle with respect to an output feedback beam axis for passing radiation in said first one of said two linear polarization states along said output feedback beam axis and for reflecting the other of said polarization states along a second axis;

a beamsplitter, disposed along said output feedback beam axis, for reflecting a predetermined portion of radiation in said first linear polarization state back along said feedback beam axis and for passing radiation in said second linear polarization state along said feedback beam axis;

a polarization rotation element, disposed along said output feedback beam axis, for rotating radiation in said first linear polarization state to said second polarization state; and mirror means disposed to receive said radiation in said second linear polarization state and to transport said radiation in said second linear polarization state back along said second axis to combine with said radiation in said one of said linear polarization states, whereby two beams of processed output feedback radiation combine to form said adjoint mode return beam, elliptically polarized with a major axis oriented along said feedback polarization axis and an adjoint return helicity opposite to said output feedback helicity, travelling back along said output feedback beam axis into said parent laser resonator.

10. A laser system for producing an elliptically polarized output beam comprising an unstable parent laser resonator having a gain medium, pump means for producing a population inversion in said gain medium, mirror means disposed along an axis for directing optical radiation through said gain medium in a magnifying output mode and a demagnifying adjoint mode, and output means for directing an output beam out of said unstable resonator, comprising;

adjoint feedback means having at least one feedback aperture disposed to intercept radiation in said magnifying output mode, whereby a portion of said radiation in said magnifying output mode passes through said at least one feedback aperture as an output feedback beam, and for passing through a return feedback aperture of said at least one feedback aperture an adjoint mode feedback beam mode matched to said demagnifying adjoint mode;

said adjoint feedback means including adjoint feedback reflection means for receiving said output feedback beam passed through said feedback aperture and for feeding back through said return feedback aperture said adjoint mode feedback beam having a predetermined amount of feedback power in said demagnifying adjoint mode, whereby radiation in said output mode in said parent resonator is coupled to said adjoint mode in said parent resonator through the passing of said adjoint mode feedback beam through said return feedback aperture, and said laser system comprises a composite resonator including said parent laser resonator and a resonator control leg comprising said adjoint feedback reflection means;

feedback beam polarization means, are located intercepting said output feedback beam, for converting said output feedback beam to a first linearly polarized intermediate beam having a first predetermined azimuthal angle with respect to a reference azimuthal angle, generating a second linearly polarized intermediate beam having a predetermined second azimuthal angle with respect to said reference azimuthal angle that is symmetric about said reference angle from said first azimuthal angle and for combining said first and second intermediate beams to form said return adjoint feedback beam.

11. A system according to claim 10, in which said feedback beam polarization means comprises a quarter wave plate for converting elliptically polarized output feedback radiation to a transmitted feedback beam having radiation in said one of said first and second orthogonal linear polarization states;

a first linear polarizer mounted at a predetermined reflection angle with respect to an output feedback beam axis for passing radiation in said first one of said linear polarization states along said output feedback beam axis and for reflecting radiation in said second polarization state along a second axis;

mirror means disposed to receive said radiation in said second linear polarization state and to reflect said radiation in said second linear polarization state back along said output feedback beam axis;

a polarization reflection element, having a predetermined reflectivity and disposed along said second axis, for reflecting back along said second axis a predetermined amount of said radiation in said second polarization state, to combine with said radiation in said one of said linear polarization states, whereby said two intermediate beams combine to form said adjoint mode return beam travelling back along said output feedback beam axis into said parent laser resonator.

12. A laser system for producing an circularly polarized output beam comprising an unstable parent ring resonator having a gain medium, pump means for producing a population inversion in said gain medium, mirror means for directing optical radiation through said gain medium in a magnifying output mode and a demagnifying adjoint mode, and outcoupling means for directing an output beam out of said unstable resonator, comprising;

adjoint feedback means having at least one feedback coupling means disposed to intercept radiation in said magnifying output mode, whereby a portion of said radiation in said magnifying output mode is coupled into said adjoint feedback means as an output feedback beam, and for passing an adjoint mode feedback beam mode matched to said demagnifying adjoint mode back into said parent ring resonator;

said adjoint feedback means including adjoint feedback reflection means for receiving said output feedback beam and for feeding back said adjoint mode feedback beam having a predetermined amount of feedback power in said demagnifying adjoint mode, whereby radiation in said output mode in said parent resonator is coupled to said adjoint mode in said parent resonator through the passing of said adjoint mode feedback beam back into said parent ring resonator and said laser system comprises a composite resonator including said parent laser resonator and a resonator control leg comprising said adjoint feedback reflection means;

feedback beam polarization means are located intercepting said output feedback beam, for impressing a desired polarization state on said adjoint mode feedback beam, so that said resonator control leg comprises said adjoint feedback reflection means and said beam polarization means and feeds radiation in a desired circular polarization state above a predetermined feedback threshold amount back into said parent laser resonator mode-matched to said adjoint mode so that said resonator control leg controls the polarization of said parent laser resonator.

13. A laser system according to claim 12, in which said beam polarization means comprises a first quarter wave plate, a linear polarizer and a second quarter wave plate disposed sequentially along a feedback beam axis and arranged to convert circularly polarized radiation travelling along said feedback beam axis to linear polarized radiation, to then rotate said linearly polarized radiation to an orthogonal linear polarization state, and to then convert said orthogonal linearly polarized radiation to circularly polarized radiation in a predetermined circular polarization state; and beam transport means for converting radiation in said predetermined circular polarization state into a return circularly polarized state and for passing radiation in said return circularly polarized state back into said parent resonator, said return circularly polarized state being adapted to couple into said adjoint mode of said parent resonator.

14. A laser system according to claim 12, in which said feedback aperture has a diameter greater than a threshold diameter that passes said predetermined feedback threshold amount of feedback power and less than a predetermined upper diameter limit determined by a desired beam quality.

15. A laser system according to claim 6, in which said gain medium is $CO_2$.

16. A laser system for producing an elliptically polarized output beam comprising an unstable parent ring resonator having a gain medium, pump means for producing a population inversion in said gain medium, mirror means for directing optical radiation through said gain medium in a magnifying output mode and a demagnifying adjoint mode, and outcoupling means for directing an output beam out of said unstable resonator, comprising;

adjoint feedback means having at least one feedback coupling means disposed to intercept radiation in said magnifying output mode, whereby a portion of said radiation in said magnifying output mode is coupled into said adjoint feedback means as an output feedback beam, and for passing an adjoint mode feedback beam mode matched to said demagnifying adjoint mode back into said parent ring resonator;

said adjoint feedback means including adjoint feedback reflection means for receiving said output feedback beam and for feeding back said adjoint mode feedback beam having a predetermined amount of feedback power in said demagnifying adjoint mode, whereby radiation in said output mode in said parent resonator is coupled to said adjoint mode in said parent resonator through the passing of said adjoint mode feedback beam back into said parent ring resonator and said laser system comprises a composite resonator including said parent laser resonator and a resonator control leg comprising said adjoint feedback reflection means;

feedback beam polarization means are located intercepting said output feedback beam, for impressing a desired polarization state on said adjoint mode feedback beam, so that said resonator control leg comprises said adjoint feedback reflection means and said beam polarization means and feeds radiation in a desired circular polarization state above a predetermined feedback threshold amount back into said parent laser resonator mode-matched to said adjoint mode so that said resonator control leg controls the polarization of said parent laser resonator.

17. A laser system according to claim 16, in which said adjoint feedback means includes polarization reflection means for separating said output feedback beam into a transmitted feedback beam having radiation in first and second orthogonal linear polarization states with a predetermined distribution of power in said first and second orthogonal linear polarization states, for manipulating said transmitted beam, and for directing a return feedback beam having a desired distribution of power in said first and second orthogonal linear polarization states back into said feedback aperture mode matched to said adjoint mode;

said beam polarization means comprises a first quarter wave plate, a linear polarizer and a second quarter wave plate disposed sequentially along a feedback beam axis and arranged to converts elliptically polarized radiation travelling along said feedback beam axis to linear polarized radiation having a polarization axis oriented at an angle other than 45° to a fast axis of said first quarter wave plate, to then convert aid linearly polarized radiation to elliptically polarized radiation in a predetermined elliptical polarization state; and beam transport means for converting radiation in said predetermined elliptical polarization state into a return elliptically polarized state and for passing radiation in said return elliptically polarized state back into said parent resonator, said return elliptically polarized state being adapted to couple into said adjoint mode of said parent resonator.

* * * * *